US009764563B2

(12) United States Patent
Song et al.

(10) Patent No.: US 9,764,563 B2
(45) Date of Patent: Sep. 19, 2017

(54) LASER MARKING MACHINE, LASER MARKING METHOD, LASER MARKING EQUIPMENT AND LASER MARKING SYSTEM

(71) Applicant: Maxphotonics Corporation, Shenzhen (CN)

(72) Inventors: Jun Song, Shenzhen (CN); Gaofeng He, Shenzhen (CN); Xiaobo Hu, Shenzhen (CN); Feng Jiang, Shenzhen (CN)

(73) Assignee: MAXPHOTONICS CORPORATION, Shenzhen (CN)

( * ) Notice: Subject to any disclaimer, the term of this patent is extended or adjusted under 35 U.S.C. 154(b) by 0 days.

(21) Appl. No.: 14/870,024

(22) Filed: Sep. 30, 2015

(65) Prior Publication Data

US 2016/0318310 A1 Nov. 3, 2016

(30) Foreign Application Priority Data

Apr. 30, 2015 (CN) .......................... 2015 1 0219312
Apr. 30, 2015 (CN) .......................... 2015 1 0220430

(51) Int. Cl.
*B41J 2/47* (2006.01)
*B23K 26/00* (2014.01)
(Continued)

(52) U.S. Cl.
CPC ............. *B41J 2/47* (2013.01); *B23K 26/0081* (2013.01); *B23K 26/0626* (2013.01);
(Continued)

(58) Field of Classification Search
CPC ................................... B41J 2/47; B41J 2/442
See application file for complete search history.

(56) References Cited

U.S. PATENT DOCUMENTS 8,585,956 B1 11/2013 Pagryzinski et al.
2005/0225846 A1* 10/2005 Nati .................... H01S 3/06758
359/341.1
(Continued)

FOREIGN PATENT DOCUMENTS

CN 101221616 A 7/2008
CN 101352975 A 1/2009
(Continued)

*Primary Examiner* — Geoffrey Mruk
*Assistant Examiner* — Scott A Richmond
(74) *Attorney, Agent, or Firm* — Gokalp Bayramoglu

(57) ABSTRACT

Disclosed a laser marking machine, method, equipment and system. The method comprises steps of: the control main board receiving coordinate and gray scale value of the target image pixel dot; calculating output power of the target image pixel dot by using the gray scale value; and controlling the laser device to use corresponding output power according to displacement of the galvanometer, and outputting laser specific to each target image pixel dot. By adjusting the output power of target image pixel dot (marking point), a separate pixel dot may reflect the change of gray scale value, so as to represent the image gray scale value. The coordinate of each pixel dot in the gray scale image may be calculated according to the predetermined resolution, such that, the coordinate of pixel dot is no longer adjusted, ensuring the DPI and the resolution of the gray scale image.

5 Claims, 10 Drawing Sheets

(51) Int. Cl.
*B23K 26/06* (2014.01)
*B41M 5/24* (2006.01)
*B23K 26/082* (2014.01)
*B23K 26/361* (2014.01)

(52) U.S. Cl.
CPC .......... *B23K 26/082* (2015.10); *B23K 26/361* (2015.10); *B41M 5/24* (2013.01)

(56) References Cited

U.S. PATENT DOCUMENTS

| | | | | |
|---|---|---|---|---|
| 2008/0214391 | A1* | 9/2008 | Kawahara | ................ B41J 2/442 |
| | | | | 503/201 |
| 2009/0243155 | A1 | 10/2009 | Martinez | |
| 2010/0128102 | A1* | 5/2010 | Yamasaki | .................. B41J 2/32 |
| | | | | 347/248 |
| 2012/0212564 | A1* | 8/2012 | Yamamoto | ............. B41J 2/4753 |
| | | | | 347/225 |

FOREIGN PATENT DOCUMENTS

| | | | |
|---|---|---|---|
| DE | 19707003 | A1 | 8/1997 |
| DE | 10339472 | A1 | 3/2006 |

\* cited by examiner

LASER MARKING MACHINE, LASER MARKING METHOD, LASER MARKING EQUIPMENT AND LASER MARKING SYSTEM

TECHNICAL FIELD

The present disclosure relates to the technical field of laser marking and, more particularly, to a laser marking method, a laser marking machine, laser making equipment, and laser marking system.

BACKGROUND

Laser marking is capable of marking characters, symbols and patterns and the like. Laser marking is a marking method using high power density laser to irradiate a portion of work piece to gasify surface material or generate chemistry reaction of color change, thusly leaving a permanent mark.

In the conventional marking machine, marking software may keep configured pixels according to resolution settings of an operator and perform a gray scale calculation according to the three sub-pixels of red, green and blue, thusly obtaining a gray scale value of each pixel. The gray scale difference of an image may be presented by a number of marking points per unit area, that is, the gray scale may be presented dependently on a density of marking points. Since the unit area is too small to be detected by naked eyes, only continuous change in pictures may be felt. In the conventional marking technology, the marking control is separate from the laser control. In the laser control, a segment control is employed, which is coarse, and not accurate enough to be used in the control of marking points, such that the marking resolution is not high enough and the marking efficiency is low.

Moreover, different materials have different capacities of absorbing laser. Thusly, it is needed to select different laser devices by human when processing laser marking on different materials. For example, when marking a mobile phone case, if the case is plastic or carbon fiber, a power within 5 w should be adopted, an over-large power may directly ruin the case; however, to a metal case, over 20 w power should be adopted, a too small power may lead to unsuccessful marking. When a user needs to perform marking on different materials, he or she has to buy marking machines with different output powers, which severely increase the expense burden of the user.

As a result, one of technical problems that a skilled person in the art needs to solve urgently is, how to match the output power of the laser marking machine with the material to be marked.

SUMMARY OF THE INVENTION

A technical problem to be solved in the embodiment of the disclosure is to provide a laser marking method which could separately control the coordinate and the output power of the marking point, and the accurate match between material to be marked and output power of the laser marking machine, to achieve accurate marking.

To solve the problem above, a laser marking machine is disclosed, wherein the laser marking machine comprises: a control main board, a laser device and a galvanometer, the laser device and the galvanometer being connected to the control main board, respectively; the galvanometer being configured to move at a predetermined moving speed on the basis of coordinate of target image pixel dot; the laser device being configured to output laser;

the laser marking machine further comprises:

a first receiving module at the control main board, configured to receive coordinate of the target image pixel dot and gray scale value of the target image pixel dot;

a first calculation module at the control main board, configured to calculate output power of the target image pixel dot by using the gray scale value; and a control module at the control main board, configured to control the laser device to use corresponding output power according to displacement of the galvanometer, and to output laser specific to each target image pixel dot.

Another embodiment of the disclosure discloses laser marking equipment, comprising a laser marking machine and a control platform, wherein the laser marking machine is controlled by the control platform, the laser marking machine comprises: a laser device and a galvanometer signally connected to the control platform, respectively, the galvanometer being configured to move at a predetermined moving speed on the basis of coordinate of target image pixel dot; and the laser device being configured to output laser; the laser marking equipment further comprises:

a first obtaining module at the control platform, configured to obtain coordinate of the target image pixel dot and a gray scale value of the target image pixel dot;

a first calculation module at the control platform, configured to calculate output power of the target image pixel dot according to the gray scale value;

a second obtaining module at the control platform, configured to obtain the material information to be marked;

a third obtaining module at the control platform, configured to obtain corresponding material output power according to the material information;

a secondary calculation module at the control platform, configured to calculate an amended output power of the target image pixel dot according to the output power calculated by the gray scale value and the material output power; and the control module at the control platform, configured to control the laser device to use corresponding amended output power according to displacement of the galvanometer, and output laser specific to each target image pixel dot.

Still another embodiment discloses a laser marking method, wherein a laser marking machine is used to mark, the laser marking machine comprises: a control main board, a laser device and a galvanometer connected to the control main board, respectively; the galvanometer being configured to move at a predetermined moving speed on the basis of coordinate of target image pixel dot; and the laser device being configured to output laser;

the method comprising steps of:

the control main board receiving coordinate of the target image pixel dot and gray scale value of the target image pixel dot;

the control main board calculating output power of the target image pixel dot by using the gray scale value; and the control main board controlling the laser device to use corresponding output power according to displacement of the galvanometer, and outputting laser specific to each target image pixel dot.

Further an embodiment of the disclosure discloses a laser marking system, wherein the laser marking system comprises: a control platform, an intelligent terminal and a laser marking machine signally connected to the control platform, respectively, the laser marking machine comprises a laser device and a galvanometer, the galvanometer is configured to move at a predetermined moving speed based on coordinate of the target image pixel dot, the laser device is configured to output laser, the intelligent terminal is configured to upload an image to be marked to the control platform, the laser marking system further comprises:

a first obtaining module at the control platform, configure to obtain coordinate of the target image pixel dot and gray scale value of the target image pixel dot;

a first calculation module at the control platform, configured to calculate output power of the target image pixel dot according to the gray scale value;

a second obtaining module at the control platform, configured to obtain material information to be marked;

a third obtaining module at the control platform, configured to obtain the corresponding material output power according to the material information:

a secondary calculation module at the control platform, configured to calculate an amended output power of the target image pixel dot according to the output power calculated by the gray scale value and the material output power; and a control module at the control platform, configured to control the laser device to use corresponding amended output power according to displacement of the galvanometer, and output laser specific to each target image pixel dot.

Compared to the prior art, the embodiment of the disclosure may have advantages as follows:

In the disclosure, by adjusting the output power of target image pixel dot (marking point), a separate pixel dot may reflect the change of gray scale value, so as to represent the gray scale value of the image.

The coordinate of each pixel dot in the gray scale image may be calculated according to the predetermined resolution, such that, in the process of marking, the coordinate of pixel dot is no longer adjusted, which ensures the DPI and the resolution of the gray scale image.

The method of representing the gray scale by the density of marking points is eliminated, such that each of the marking points may represent the gray scale value, which comparatively improves the efficiency of marking.

DETAILED DESCRIPTION OF THE EMBODIMENTS

In order to better understand above objects, features and advantages, the disclosure will be described below in detail in conjunction with accompanying drawings and specific embodiments.

Figure 1:
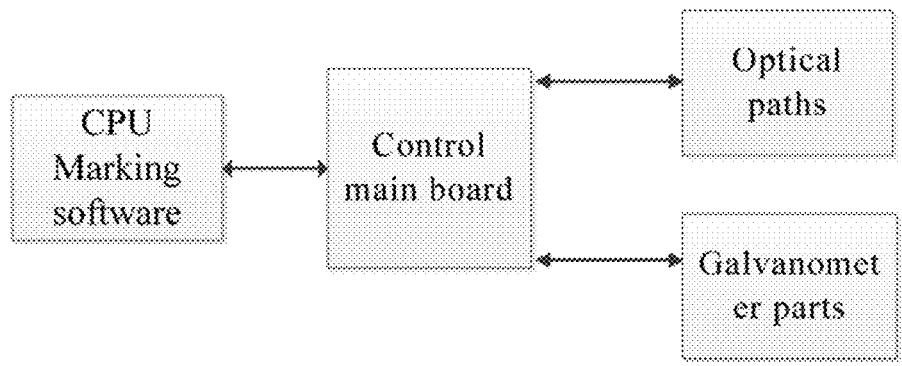
FIG. 1 is a block diagram of a commonly-used marking machine.

With reference to FIG. 1, it shows a block diagram of a commonly-used marking machine. The commonly-used marking machine includes: CPU/marking software, a control main board, optical paths and galvanometer parts. Herein, the CPU/marking software is mainly used to process and edit graphics (such as bitmap, vector graphic, text, QR code and the like), and to transform the graphics to marking instructions which could be recognizable by the control main board according to settings and marking conditions of an operator. The marking instructions are action splits when the marking machine is marking. Each instruction is one action of the marking machine. Once the instructions are generated, they are packaged to a communication packet of an agreement protocol and transmitted to the control main board. The control main board receives the marking instructions from CPU, stores and parses the instructions, and then control operations of back-end optical paths and a galvanometer according to parsed data. Laser moves at a relatively uniform-speed on a plane through a galvanometer. In this manner, marking may be performed on an object to be marked.

Figure 2:
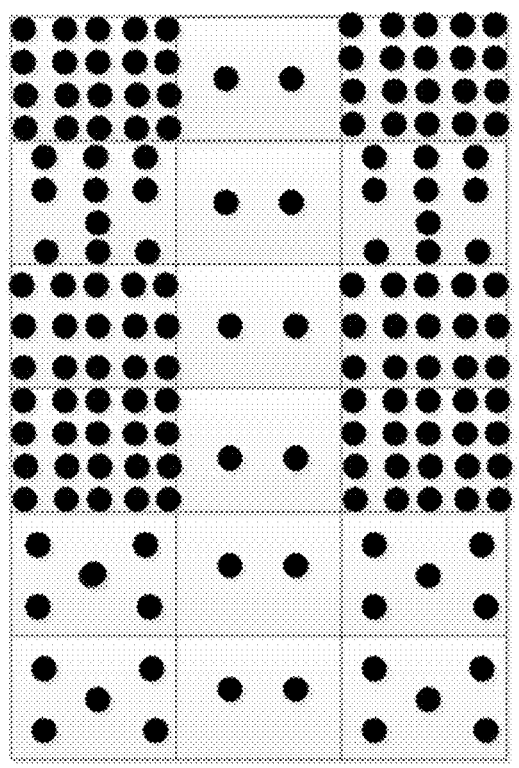
FIG. 2 shows representations of the gray scale in a conventional laser marking machine.

With reference to FIG. 2, it shows representations of the gray scale in an existing laser marking machine. As it is shown, the unit area that is all covered by engraving would have the largest gray scale value, while the unit area that has not been engraved at all would have the smallest gray scale value. By matching the marking points in all unit areas to generate the instructions, the control main board may control the laser and the galvanometer to cooperate to engrave the areas according to the parsed instructions.

The representation of gray scale difference may be realized by the existing method, but there are following disadvantages:

1. A concept of basic pixel dots of an image is shifted in the existing method. In order to represent the gray scale in the engraving, the original concept of pixel dot is shifted to the unit area. The shift of concept is based on the sacrifice of DPI and minimum resolution. As a result, the resolution of marking is not high and the marked image is not fine enough.

2. In order to raise the concept of gray scale, a great number of engraving points are gathered to represent the gray scale of one pixel dot. As a result of an increment of minimum image unit, the efficiency of marking is lowered.

3. Rate and frequency of a marking machine in the marking process are generally fixed. Therefore a change in the gray scale of a pixel consequentially leads to a change in distance between dots. This change is managed simply by a skip in marking.

One of main conceptions of the embodiment of the disclosure is to separately control an output power of each target image pixel (marking point), and to transform the target image pixels having different gray scales to the marking points having different powers.

Figure 3:
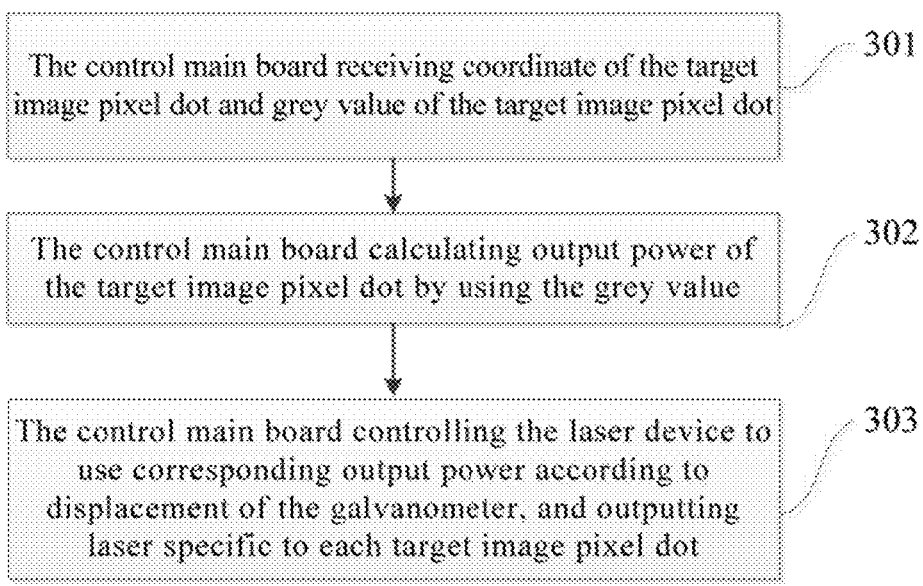
FIG. 3 is a flow chat of a laser marking method according to an embodiment of the disclosure.

With reference to FIG. 3, it shows a flow chat of a laser marking method according to as first embodiment of the disclosure, wherein a laser marking machine is used to mark. The laser marking machine includes: a control main board, a laser device and a galvanometer, the laser device and the galvanometer being connected to the control main board, respectively; the galvanometer being configured to move at a predetermined moving speed on the basis of coordinate of target image pixel dot; and the laser device being configured to output laser; the method may particularly comprise steps of:

Step 301: the control main board receiving coordinate of the target image pixel dot and gray scale value of the target image pixel dot;

Step 302: the control main board calculating output power of the target image pixel dot by using the gray scale value; and Step 303: the control main board controlling the laser device to use corresponding output power according to displacement of the galvanometer, and outputting laser specific to each target image pixel dot.

Prior to Step 301, the method may further include:

the control main board receiving an image to be marked, and transforming the image to be marked to a gray scale image with predetermined resolution; and the control main board calculating coordinate of each pixel dot in the gray scale image by using the resolution, and taking the coordinate of each pixel dot in the gray scale image as coordinate of the target image pixel dot.

Figure 4:
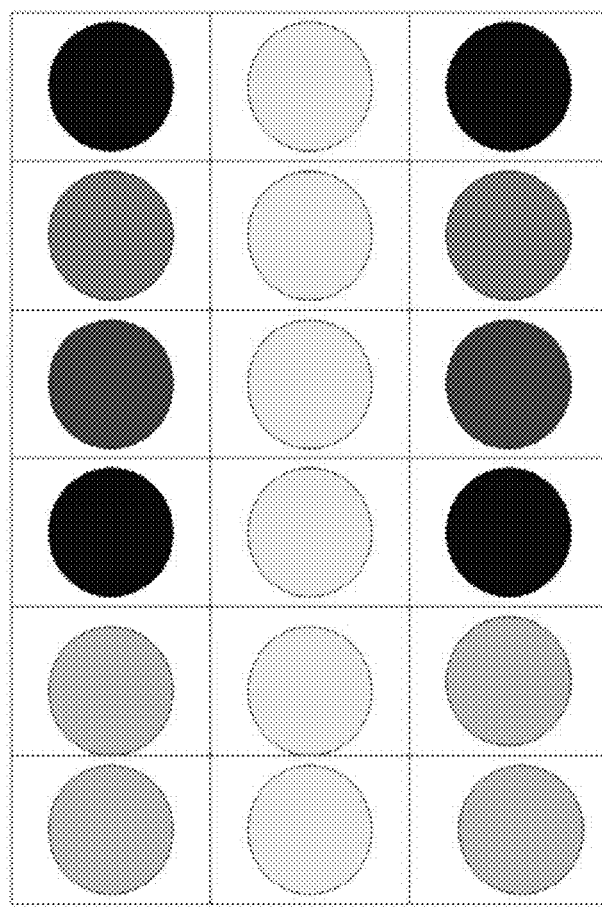
FIG. 4 shows representations of the gray scale according to the embodiment of the disclosure.

Directing towards the problems in the existing laser marking method, the disclosure discloses a new way to represent gray scale, in which marking depth may be controlled by marking power, and marking gray scale is controlled by the marking depth. In other words, the higher the power is the greater the gray scale is. The marking process is to transform pixels of the image having different gray scales to the marking points having different powers. With reference to FIG. 4, it shows representations of the gray scale according to the embodiment of the disclosure.

In the embodiment of the disclosure, firstly the image to be marked is transformed to the gray scale image which may be specifically customized according to the resolution required by the user. The resolution is the number of dots constituting the gray scale image. For example, a resolution of 1024×768 means that there are 1024 dots on a horizontal coordinate of the gray scale image and 768 dots on a longitudinal coordinate. By transforming the image to be marked according to a predetermined resolution, a gray scale image having a predetermined number of dots may be obtained. The transformation of the gray scale value for each dot may be calculated by a brightness value of pixel dot in the original image. The brightness value refers to a value of red, green and blue sub-pixels in the image. For example, transformation formula of the gray scale may be as follows: gray=0.3*red+0.59*green+0.11*blue. The gray scale value is transformed to a power value of 0-100. Finally, three sub-pixels of bitmap are transformed to the pixel coordinate and the power value of each dot.

An amount of laser power is dependent on an amount of pump current of the laser device. Therefore, to a certain degree the control of the power of each marking point is equivalent to the control of the amount of pump current.

Figure 5:
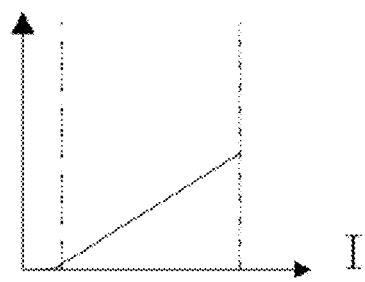
FIG. 5 is a schematic diagram showing a linear relationship between pump current and laser power in the disclosure.

With reference to FIG. 5, it is a schematic diagram showing linear relationship between the pump current and the laser power in the disclosure. Within a certain range, there is a linear relationship between the change in the pump current and the change in the laser power, with a coefficient K. That is, $W=IK$. By experiment, this linear range may be learned and the coefficient K can be determined. Similarly, within other ranges, there is a curvilinear relationship between the change in the pump current and the change in the laser power.

The marking software may transform the bitmap to a plurality of pixel dots with different gray scales according to the settings of resolution and the brightness value of each pixel dot in the original image. Once the resolution is determined, the distance between dots may be determined. Once marking brightness is determined, an absolute gray scale of each dot may be determined. As a result, power value and absolute coordinate of each engraving point may be determined.

It should be noted that the laser frequency refers to times of output laser per second by the laser device. The marking solution in the disclosure mainly includes three elements: galvanometer speed, absolute coordinate of each dot and marking power of each dot. The marking machine may control uniform movement of the galvanometer at a configured speed. After the galvanometer reaches an absolute coordinate of a certain dot, the marking may be performed at the appropriate power corresponding to this dot.

Figure 6:
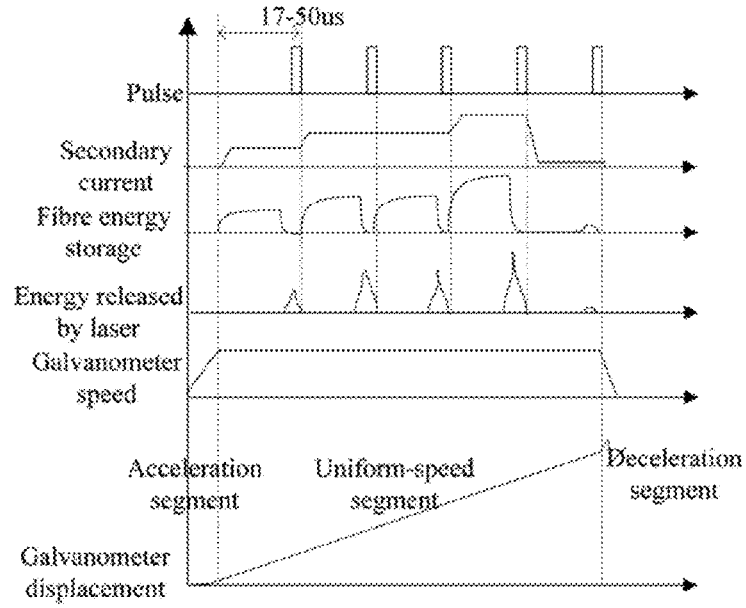
FIG. 6 is a schematic diagram showing the control of the laser power according to the embodiment of the disclosure.

With reference to FIG. 6, it is a schematic diagram showing the control of the laser power according to the embodiment of the disclosure. FIG. 6 shows relation among parameters such as the pulse, the pump current, the fibre energy storage, the galvanometer speed and the galvanometer displacement. In the embodiment of the disclosure, there is defined a term "laser period". The laser period refers to a timing sequence main line connecting the laser device and the galvanometer in the disclosure.

For the laser device, the laser period refers to a time period of "updating pump current-work fibre storing energy-releasing laser". The laser device may include: a pump, a work fibre connected to the pump and an output switch connected to the work fibre. The output switch may be an acoustic control switch. In a single laser period, the work fibre would receive the current output from the pump and start the fibre energy storage. When a laser period is reached, the control main board would transmit ON instruction to the acoustic control switch, and the acoustic control switch would switch on upon the receipt of the instruction and output the laser stored in the work fibre.

For the galvanometer, the laser period refers to a time period of "moving the galvanometer to a coordinate of a marking point to mark". In order to realize the cooperation of the laser device with the galvanometer during the laser period, for the galvanometer, the following three items should be noted:

1. The movement of the galvanometer includes three stages: an acceleration segment, a uniform-speed segment and a deceleration segment. In practice, the laser device may proceed to mark only when the galvanometer is in the uniform-speed segment. Therefore, the laser device may be necessarily shielded when the galvanometer is in the acceleration segment or the deceleration segment, avoiding marking in above two segments.

2. The galvanometer would be kept moving according to the marking instructions after being in the uniform-speed segment until all dots are marked. That is, in the process of marking, for the marking points in half way, the galvanometer will not stop after reaching the marking points.

Figure 7:
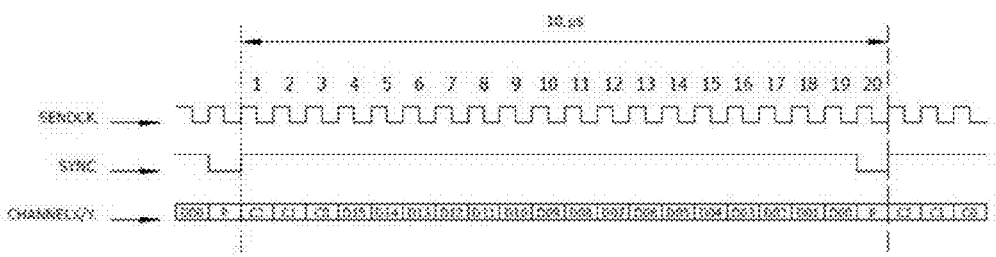
FIG. 7 is a schematic diagram showing the XY2-100 protocol.

3. At this point, the protocol employed by galvanometer may substantially be XY2-100 protocol. With reference to FIG. 7, it is schematic diagram of XY2-100 protocol. According to XY2-100 protocol, the control main board would transmit control instructions to the galvanometer every 10 μs. The control instructions include a coordinate of next target image pixel dot. The galvanometer may include a digital-analogue (DA) converter. The DA of the galvanometer may transform the coordinate of next target image pixel dot to movement parameters of the galvanometer. The galvanometer may move to next target image pixel dot according to the movement parameters. However, this protocol itself is a non-interactive protocol. Therefore, the control main board is merely conscious of whether the location command is completely transmitted without obtaining whether the galvanometer has executed.

In the embodiment of the disclosure, Step 303 includes sub-steps of:

Sub-step S31: the control main board judging whether the time when the galvanometer is displaced to current pixel dot reaches a predetermined time delay;

Sub-step S32: if yes, then determining that the galvanometer is displaced to the current pixel dot;

Sub-step S33: when determining the galvanometer is displaced to the current pixel dot, the control main board controlling the laser device to output laser with corresponding output power specific to the current pixel dot.

Further, the predetermined time delay may include: acceleration delay, uniform-speed delay and deceleration delay.

The step of the control main board judging whether the time when the galvanometer is displaced to current pixel dot reaches a predetermined time delay comprises three processing situations.

In the first situation, when the current pixel dot is a start pixel dot, the control main board judges whether the time when the galvanometer is displaced to current pixel dot reaches the predetermined acceleration delay: the start pixel dot is the first marking point when the laser marking machine is in operation.

In the second situation, when the current pixel dot is a midway pixel dot, the control main board judges whether the time when the galvanometer is displaced to current pixel dot reaches the predetermined uniform-speed delay; the midway pixel dot is a marking point when the laser marking machine marks from the first marking point to the last marking point.

In the third situation, when the current pixel dot is an end pixel dot, the control main board judges whether the time when the galvanometer is displaced to current pixel dot reaches the predetermined deceleration delay; the end pixel dot is the last marking point when the laser marking machine is in operation.

Figure 8:
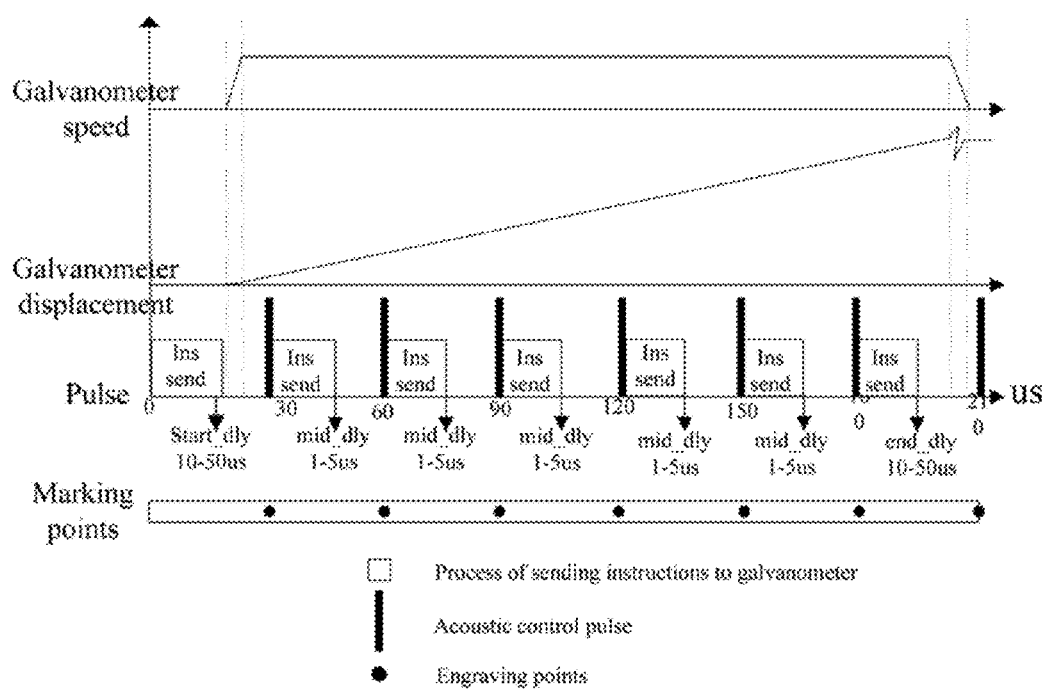
FIG. 8 is a time sequence chart controlled by the laser in practice according to the embodiment of the disclosure.

In the light of above three items for attention, with reference to FIG. 8, it shows a time sequence image controlled by the laser in practice according to the embodiment of the disclosure. A reference time point may be necessarily set for the laser period and the acoustic control pulse of the laser device to determine whether the galvanometer reaches the coordinate. In the embodiment of the disclosure, the last clock period of the command transmitted through XY2-100 protocol is selected as a reference point. After the command is transmitted, an corresponding delay is awaited. A wait delay may be used to determine the displacement of the galvanometer. The wait delay is to wait for DA action of the galvanometer, and wait for a motor to move to a coordinate of next target image pixel dot as required by the command.

Since the control main board employing XY2-100 protocol could not obtain the current location of the galvanometer and the galvanometer may be regarded as being kept in the uniform-speed state in the process of marking, the galvanometer may be considered to reach next target image pixel dot by waiting for a corresponding delay. Herein, delay may fall into three kinds of delay, i.e., "start_dly (start delay), mid_dly (middle delay) and end_dly (end delay)".

In particular, at 0 second, the control main board transmits a first command to the galvanometer, to control the galvanometer to move to a first target image pixel dot (start pixel dot). At this time, the motor of the galvanometer has not started to work, that is the moving speed of the galvanometer is 0. A period of time is need for the motor of the galvanometer to accelerate from 0 to the uniform-speed, which could be measured by experiment. In order to ensure that the laser device starts to mark in the process of uniform-speed movement of the galvanometer, the start delay is set to be larger than the acceleration time of the motor. That is, upon a wait of start delay, the galvanometer is already in the uniform-speed segment and reaches the start pixel dot. During subsequent movement of the galvanometer, the galvanometer is kept at uniform speed. At this time, delay is the midway delay. That is, upon a wait of midway delay, the galvanometer is moved to next target image pixel dot (midway pixel dot). When a next pixel dot received by the galvanometer is the last pixel dot (end pixel dot) of the target image, the galvanometer may be decelerated from uniform speed to 0. At this time, delay is the end delay. That is, upon a wait of end delay, the galvanometer is moved to the end pixel dot. The three kinds of delay could be obtained by experiment. This may ensure that the galvanometer is moved continuously at uniform speed in the process of marking, and may accurately determine the coordinates of the marking points.

In the embodiment of the disclosure, the laser device may include: a pump, a work fibre connected to the pump and an output switch connected to the work fibre; Sub-step S33 further comprises:

Sub-step S41: the control main board adjusting output current of the pump by using the output power;

Sub-step S42: the work fibre receiving the output current to store fibre energy; and Sub-step S43: when the galvanometer moves to the current pixel dot, the control main board sending out a switch instruction, the output switch releasing energy storage of a single laser period in response to the instruction; and the laser period being a period of time the work fibre starts to store energy until releasing energy.

In above solution, a minimum of the laser period is restricted by characteristics of the laser device itself, for example by rate of the fibre energy storage, i.e., by the period of time the secondary current changes from 0 to its maximum.

One marking point necessarily consumes one laser period. However, the following problems should be noted in the implementation:

(1) DA (Digital-to-Analogue conversion module) for controlling changes of the secondary current is required to have a fast response rate and a fast conversion rate. At present, DA with 100 M-200 M is universally used.

(2) When the power of marking points is frequently changed, the problem of fibre energy storage time should be considered. When the power is transformed from low to high, the fibre energy storage time would possibly not be sufficient within a single laser period, directly resulting in that the power of laser could not meet the demands.

Length of the laser period could be changed by adjusting the moving speed of the galvanometer. Since the distance between dots in the gray scale image is already determined when the resolution is fixed, the laser period may be calculated by the dot-to-dot distance and the galvanometer moving speed.

Therefore, in the embodiment of disclosure, the method further comprises:

the control main board adjusting the moving speed of the galvanometer by using the output power.

Since the rate of fibre energy storage is finite, in order to ensure that the energy storage of the work fibre is able to meet required power within a single laser period, it is necessary to adjust the length of the laser period. And since the laser period is dependent on the dot-to-dot distance and the galvanometer moving speed, in the case that the dot-to-dot distance is determined, it is necessary to change the galvanometer moving speed such that the energy storage of the work fibre is able to meet the required power within the laser period.

It should be noted that, for the simply descriptive purpose, the method embodiments are described as a series of combined actions. However, it should be appreciated by those skilled in the art that the embodiments of the disclosure should not be restricted by the sequence of the actions as set forth, since some of actions could be performed in other sequence or simultaneously. Moreover, it should also be appreciated by those skilled in the art that, the embodiments as described in the specification are preferred embodiments and actions concerned are not necessarily required in the embodiments of the disclosure.

Figure 9:
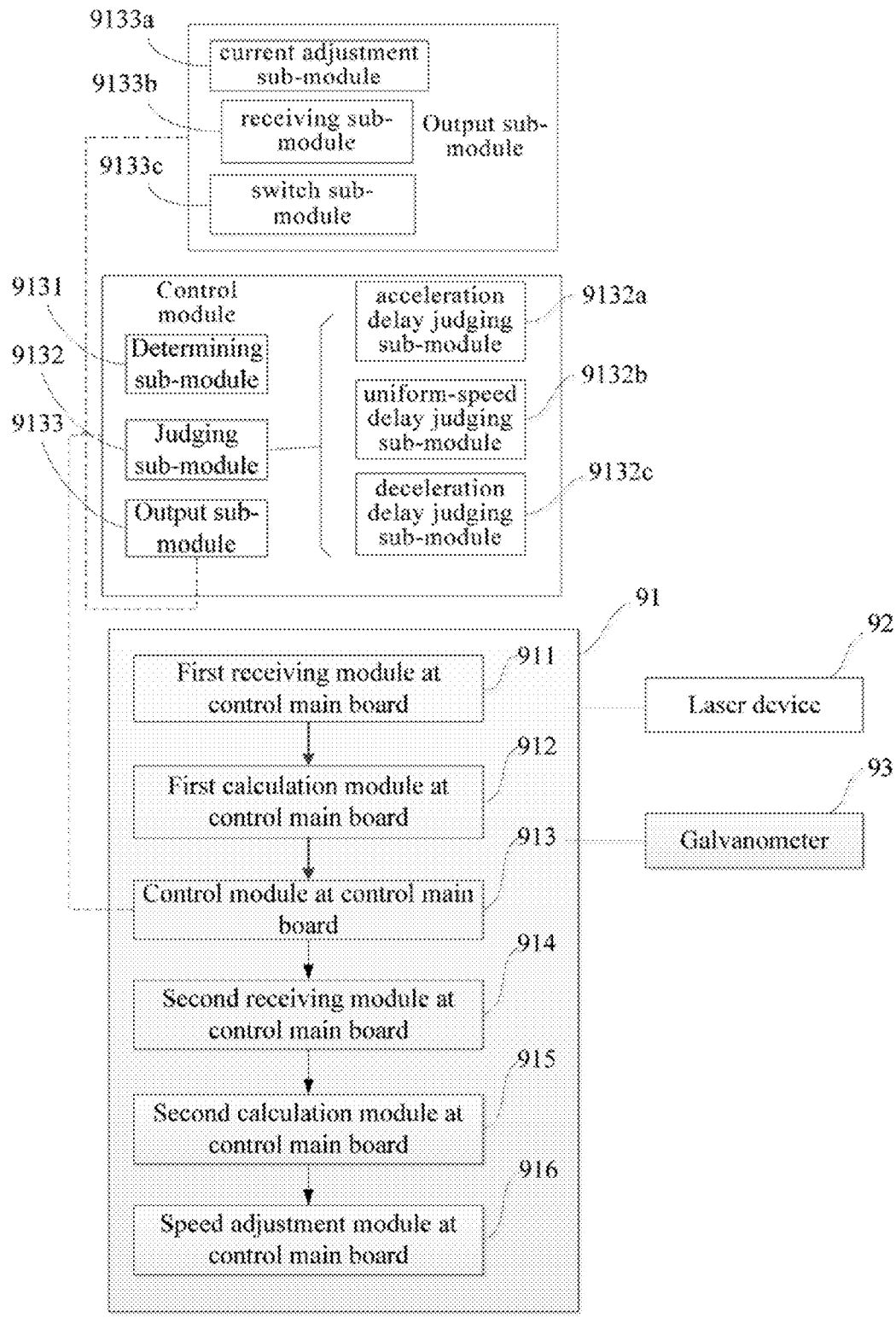
FIG. 9 is a block diagram of a laser marking machine according to an embodiment of the disclosure.

With reference to FIG. 9, it shows a block diagram of a laser marking machine according to an embodiment of the disclosure. Herein, the laser marking machine includes: a control main board 91, a laser device 92 and a galvanometer 93, the laser device and the galvanometer being connected to the control main board, respectively; the galvanometer 93 being configured to move at a predetermined moving speed on the basis of coordinate of target image pixel dot; and the laser device 92 being configured to output laser. The laser marking machine may further include the following modules:

a first receiving module 911 at the control main board, configured to receive coordinate of the target image pixel dot and gray scale value of the target image pixel dot;

a first calculation module 912 at the control main board, configured to calculate output power of the target image pixel dot by using the gray scale value; and a control module 913 at the control main board, configured to control the laser device to use corresponding output power according to displacement of the galvanometer, and to output laser for each target image pixel dot.

In the embodiment of the disclosure, the control module 913 further includes:

a judging sub-module 9132 at the control main board, configured to judge whether the time when the galvanometer is displaced to current pixel dot reaches a predetermined time delay;

a determining sub-module 9131 at the control main board, configured to determine that the galvanometer is displaced to the current pixel dot, in the case that it is judged the time when the galvanometer is displaced to current pixel dot reaches the predetermined time delay; and an output sub-module 9133 at the control main board, configured to control the laser device to output laser with corresponding output power for the current pixel dot, when it is determined that the galvanometer is displaced to the current pixel dot.

Herein, the predetermined time delay may include: acceleration delay, uniform-speed delay and deceleration delay; the judging sub-module may further include:

an acceleration delay judging sub-module 9132a, configured to judge whether the time when the galvanometer is displaced to current pixel dot reaches the predetermined acceleration delay, when the current pixel dot is a start pixel dot;

or, a uniform-speed delay judging sub-module 9132b, configured to judge whether the time when the galvanometer is displaced to current pixel dot reaches the predetermined uniform-speed delay, when the current pixel dot is a midway pixel dot;

or, a deceleration delay judging sub-module 9132c, configured to judge whether the time when the galvanometer is displaced to current pixel dot reaches the predetermined deceleration delay, when the current pixel dot is an end pixel dot.

In the embodiment of the disclosure, the laser marking machine further includes:

a second receiving module 914 at the control main board, configured to receive an image to be marked and to transform the image to be marked to a gray scale image with predetermined resolution, prior to the step of the control main board receiving the coordinate of the target image pixel dot and the gray scale value of the target image pixel dot; and a second calculation module 915 at the control main board, configured to calculate coordinate of each pixel dot in the gray scale image by using the resolution, and to regard the coordinate of each pixel dot in the gray scale image as coordinate of the target image pixel dot.

In the embodiment of the disclosure, the laser device may include: a pump, a work fibre connected to the pump and an output switch connected to the work fibre; the output sub-module further includes:

a current adjustment sub-module 9133a at the control main board, configured to adjust output current of the pump by using the output power;

a receiving sub-module 9133b at the work fibre, configured to receive the output current to store fibre energy; and a switch sub-module 9133c at the control main board, configured to send out a switch instruction such that the output switch releases energy storage of a single laser period in response to the instruction, when the galvanometer is moved to the current pixel dot, the laser period being a period of time the work fibre starts to store energy until releasing energy.

In the embodiment of the disclosure, the laser marking machine further includes:

a speed adjustment module 916 at the control main board, configured to adjust the moving speed of the galvanometer by using the output power.

Figure 10:
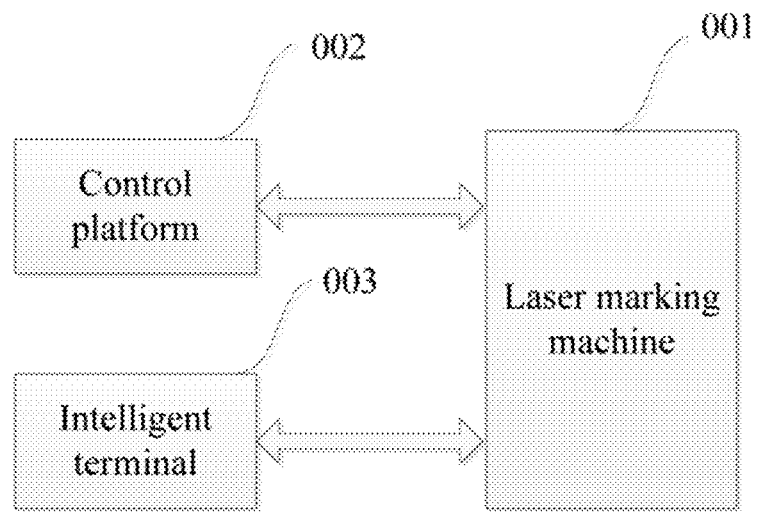
FIG. 10 is a block diagram of a laser marking system according to an embodiment of the disclosure.

With reference to FIG. 10, it is a block diagram of a laser marking system according to a second embodiment of the disclosure. Herein, the laser marking system comprises: at least one laser marking machine 001, a control platform 002 and an intelligent terminal 003, the control platform 002 and the intelligent terminal 003 being connected to the laser marking machine, respectively;

the laser marking machine 001 receives an image to be marked sent from the intelligent terminal 003;

the laser marking machine 001 transmits the image to be marked to the control platform 002, and receives marking instructions returned from the control platform 002; and the laser marking machine 001 marks according to the marking instructions.

The control platform may be an intelligent control center or a control main board.

Figure 11:
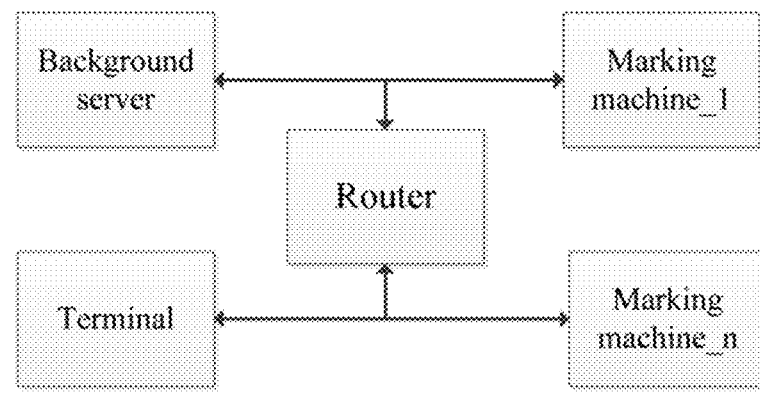
FIG. 11 is a schematic diagram showing the laser marking system according to the embodiment of the disclosure.

With reference to FIG. 11 it a schematic diagram showing the laser marking system according to the embodiment of the disclosure. As shown in the FIG. 11, the marking machine 1 is connected to a background server via a router. The marking machine n is connected to the terminal via the router.

In order to highlight the flexibility of application and the efficiency of operation, the marking machine has a network-based group function in design. Meanwhile, for the purpose of simplicity and variety of operation, strong background operating capacity and unified management of group, LAN working mode can be built by using a switch or the router with the cooperation of the background server. In operation, therefore, the marking machine may be separately used as a universal marking, machine or as a marking terminal to proceed with network-based marking function. That is, in the second embodiment of the disclosure, the marking machine may used its control main board to control the laser device and galvanometer to perform marking operation, or use the server mentioned above to control the elements such as galvanometer and laser device to operate.

By means of strong operating capacity of the background server, after finishing the calculating tasks of the marking machine, the marking machine may directly receive the marking instructions from the server according to selected mode. In the case of being used on a large scale, the background server may also be used to unitedly manage the marking machines, such as work status of the marking machine, operation time of circuit module and optical path module and the like, so as to facilitate unified maintenance. At the same time, the marking machine may perform calculating, searching and storing via storage and calculation of the background server.

Similarly, marking machine may be connected to the terminal. The terminal may transmit the image to be marked to the marking machine via wired or wireless network, for the convenience of user's operations. The terminal may be, for example, mobile phone, PC or tablet, and the image to be marked is not limited to logos, photographs, design drawings and three-dimensional pictures.

Since the device embodiment is substantially similar to the method embodiment, the description thereof is relatively brief. As for the related parts thereof, reference may be made to the corresponding description of the method embodiment.

A third embodiment of the disclosure discloses a marking method and marking system, one of the core conceptions thereof is, disposing a matching relation table of material information and corresponding, power in an intelligent processing center, when a marking platform processes different marking materials, it can choose a laser output power range matching the marking material. An image to be marked is transformed to as gray scale image, by matching gray scale value change of each pixel dot in the gray scale image to be marked with the corresponding output power range, it is achieved to more precisely match the gray scale value of the pixel dot with the corresponding output power, thusly the marking effect can meet the user's requirement in a larger extent. The intelligent processing center may be formed by data calculation, especially can be stored in internet or local area network, and it may also be stored in local or remote end to achieve data storage, searching and calculation.

Figure 12:
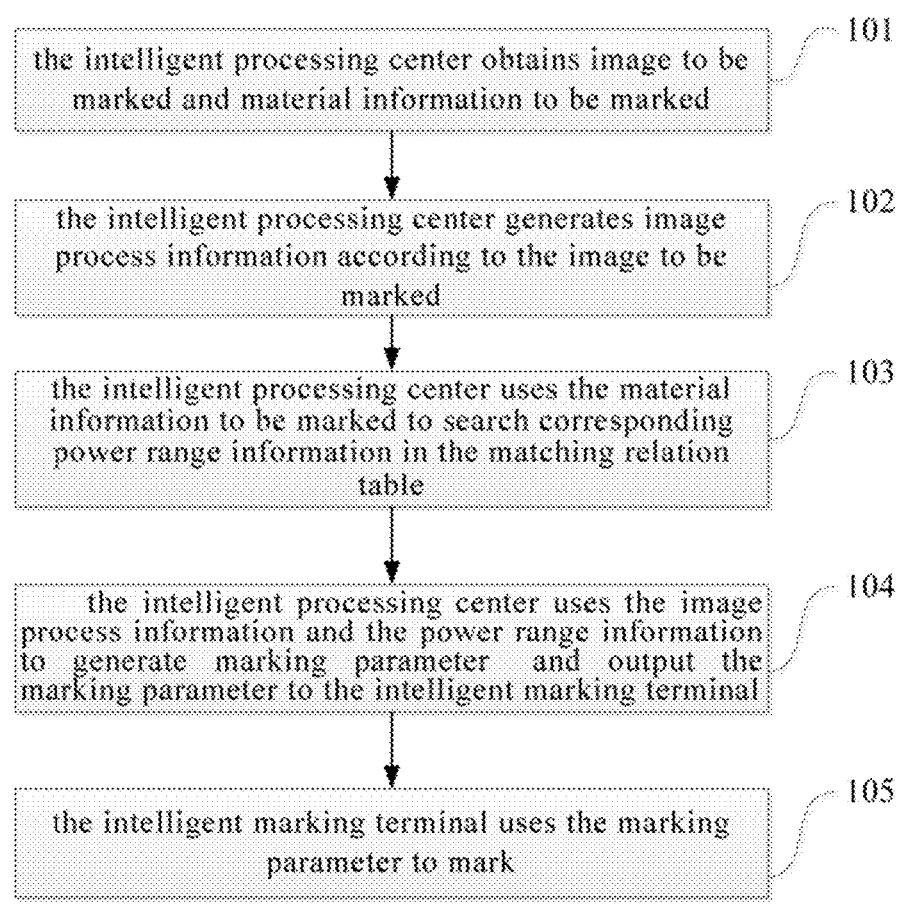
FIG. 12 is a flow chart showing a marking method according to an embodiment of the disclosure.

Referring to FIG. 12, it is a flow chart showing the marking method according to an embodiment of the disclosure. The marking platform is used in the marking process. The marking platform includes an intelligent processing center and an intelligent marking terminal connected to each other. The intelligent processing center is provided with a matching relation table of material information and corresponding power range.

It should be noted that, the matching relation table may also be disposed in the control main board in the first embodiment of the disclosure, that is, the control main board of the laser marking machine may be used to store the above-mentioned matching relation table.

The marking method according to the third embodiment of the disclosure may include the steps of:

Step 101, the intelligent processing center obtains image to be marked and material information to be marked; the image to be marked is uploaded by an intelligent terminal in a wired or wireless way. The intelligent terminal may be a smart phone, a personal computer or tablet computer, the image to be marked is not limited to be logos, photographs, design drawings and three-dimensional pictures. The intelligent processing center in the third embodiment of the disclosure may correspond to the control platform in the second embodiment, similarly, the control main board in the first embodiment may also realize part or all functions of the intelligent processing center in the third embodiment.

Step 102, the intelligent processing center generates image process information according to the image to be marked;

Step 103, the intelligent processing center uses the material information to be marked to search corresponding power range information in the matching relation table;

Step 104, the intelligent processing center uses the image process information and the power range information to generate marking parameter, and output the marking parameter to the intelligent marking terminal; the intelligent marking terminal in the third embodiment may be the same or similar as the marking machine for realizing marking function in the first and second embodiments, for example, it may include the laser device and galvanometer in the first embodiment.

Step 105, the intelligent marking terminal uses the marking parameter to mark.

Wherein step 101 may further includes sub-steps of:

S11, the intelligent processing center obtains marking material information analyzed by the intelligent marking terminal.

The marking platform is an intelligent laser marking system which includes an intelligent marking terminal and an intelligent processing center as a processing core. The intelligent marking terminal takes charge of analyzing material to be marked, and perform marking function after receiving related parameter. The intelligent processing center takes charge of receiving image to be marked and processing the image, and searching related power range information in a pre-set matching relation table of the material information and corresponding power according to obtained material type analyzed by the intelligent marking terminal, and at last obtaining the marking parameter according to the processing result to the image and the power range information of the corresponding material.

On the gray scale image to be marked, different pixel dots have different gray scale values varying from 0-255. Different gray scale values correspond to different output power. Output power may be proportional to gray scale value. For example, the output power for marking a pixel dot with gray scale value 30 is half of that for marking a pixel dot with gray scale value 60. Afterwards, during matching material with output power, each material matches a power range. After the output power range for matching the material is determined, in the output power range, the output power corresponding to the gray scale value of each pixel dot in the gray scale image to be marked is further matched, thereby realizing more precisely match between gray scale value of the pixel dot and the corresponding power. As shown in the Table below:

|  | power material | | | | |
| --- | --- | --- | --- | --- | --- |
| marking set | 0-50 | 51-101 | 102-152 | 153-203 | 204-255 |
| plastic | 1 w | 2 w | 3 w | 4 w | 5 w |
| metal | 5 w | 10 w | 15 w | 20 w | 15 w |

For example, according to the above table, if the material to be marked is plastic, it is determined that the output power for marking a pixel dot with gray scale value 30 is 1 w, the output power for marking a pixel dot with gray scale value 60 is 2 w. If the material to be marked is metal, the output power for marking a pixel dot with gray scale value 30 is 5 w, the output power for marking a pixel dot with gray scale value 60 is 10 w. The examples above are for illustration, during practical application, the gray scale value range may be divided more specific, and each range may correspond to a more specific output power. To take an example, when the material to be marked is plastic, the table may be designed to be gray scale value 0-1 corresponding to marking power 0.02, an d gray scale value 1-2 corresponding to marking power 0.04 and the like.

It should be noted that, in the embodiment of the disclosure, the method for obtaining the matching relation table may include:

according to the user's requirement, and/or, according to cloud calculating analyzing.

With respect to the method of choosing laser output power corresponding to material to be marked, in the disclosure, the intelligent processing center is provided with matching relation table of material information and corresponding power range, by looking up the matching relation table, the laser output power range is obtained. Material and its corresponding power range may be determined according to marking effect during the user's actual usage, or obtained by marking effect analyzing to a large amount of materials via cloud calculation. In the same marking material, the relation between gray scale value and output power may not be limited as the linear relationship as the above example.

In the third embodiment of the disclosure, the image process information may include: pixel dot coordinate and pixel dot gray scale value, the step 102 may further include sub steps of:

S21, the intelligent processing center transforms the image to be marked to a gray scale image;

S22, the intelligent processing center determines the coordinate of each pixel dot and corresponding pixel dot gray scale value in the gray scale image.

After receiving the image to be marked, the intelligent processing center first transforms the image to gray scale image with 256 levels, and determines coordinate of each pixel dot in the gray scale image and gray scale value of the corresponding pixel dot.

Wherein, the marking parameter may include: pixel dot coordinate and pixel dot output power, step 104 may further include the sub-steps of:

S41, the intelligent processing center searches the pixel dot output power of the corresponding pixel dot gray scale value from the output power range;

S42, the intelligent processing center combines the pixel dot coordinate and the pixel dot output power to marking parameter.

Figure 13:
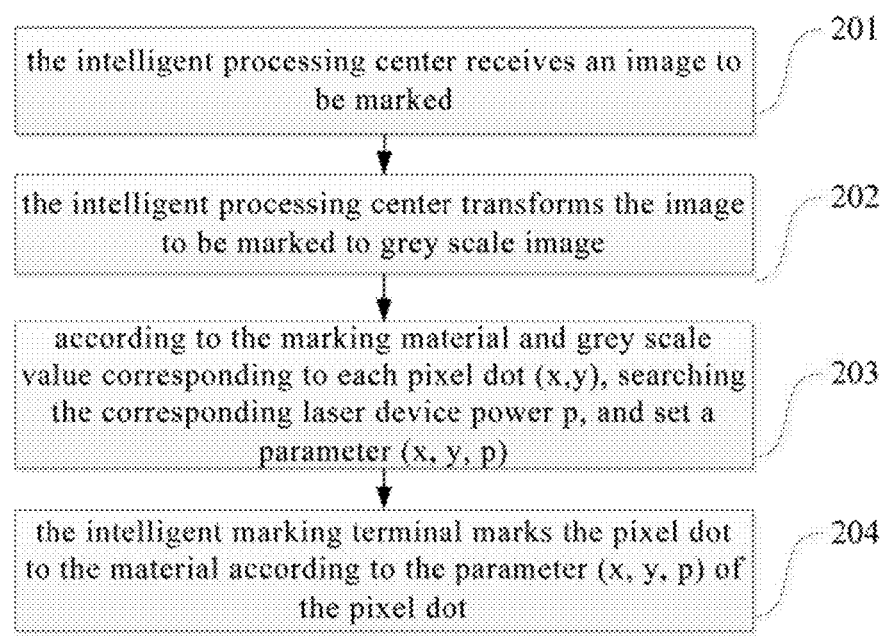
FIG. 13 is a flow chart showing another a marking method according to the embodiment of the disclosure.

As shown in FIG. 13, it is a flow chart showing the marking method in an embodiment of the disclosure. Detailedly, the method includes:

Step 201, the intelligent processing center receives an image to be marked;

Step 202, the intelligent processing center transforms the image to be marked to gray scale image;

Step 203, according to the marking material and gray scale value corresponding to each pixel dot (x,y), searching the corresponding laser device power p, and set a parameter (x, y, p);

According to the material to be marked such as metal (stainless steel) case and the gray scale value corresponding to each image pixel dot (x,y), searching the corresponding laser device power p, and set the parameter (x, y, p). For example, at the position of pixel dot (100, 100) that is x=100 and y=100, the gray scale value is 50, after searching in the intelligent processing center, it is found that the condition "value=50 and material=metal" corresponds to laser device power p=1000 mw, then the parameter (100, 100, 1000) corresponding to the pixel dot is send to the intelligent marking terminal.

Step 204, the intelligent marking terminal marks the pixel dot to the material according to the parameter (x, y, p) of the pixel dot.

The intelligent marking terminal marks the pixel dot to the material according to the parameter (100, 100, 1000) of the pixel dot, and, other pixel dots are in sequence marked to the metal (stainless steel) case according to marking principle, at last, a whole picture is formed.

It should be noted that, to method embodiment, for concise illustration, the method is described as a serious of action combination, but a skilled person in the art knows that, the embodiment of the disclosure is not limited by step sequence, because according to the embodiment of the disclosure, some steps can have other sequence or performed at the same time. Secondly, the skilled person in the art also should know that, embodiments described in the disclosure are just preferred embodiments, the actions mentioned in the embodiment may not be necessary in the embodiment of the disclosure.

Figure 14:
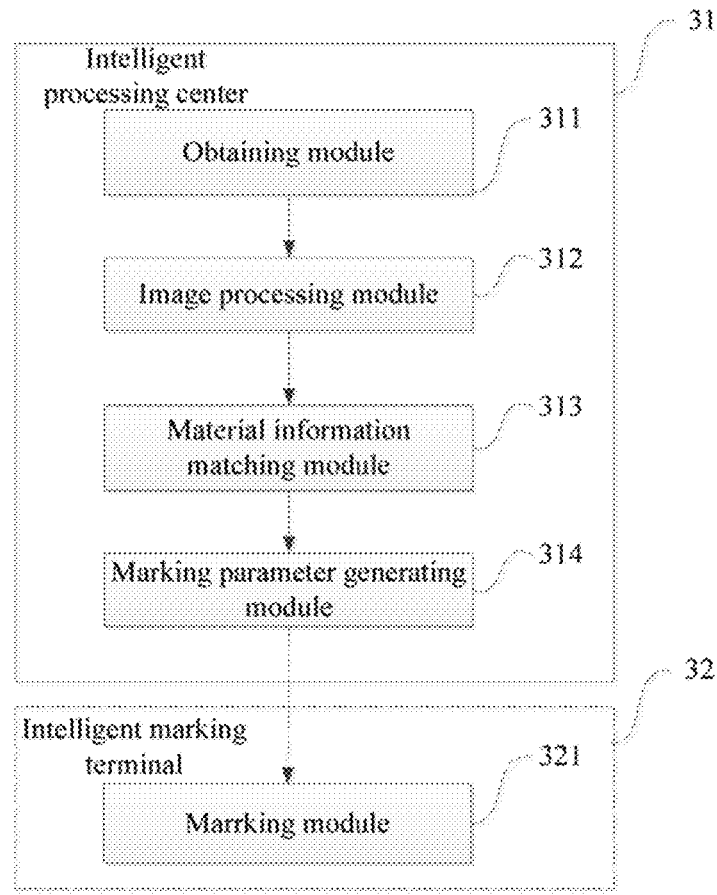
FIG. 14 is a block diagram showing a marking platform according to the embodiment of the disclosure.

As shown in FIG. 14, it is a block diagram showing a marking platform corresponding to the third embodiment of the disclosure. The marking platform includes an intelligent processing center 31 and an intelligent marking terminal 32 connected to each other. The detailed connecting and communication way may be wired network, wireless network or local serial port. The intelligent processing center is provided with matching relation table of material information and corresponding power range. Detailedly, modules as below can be included:

an obtaining module 311 at the intelligent processing center, for obtaining the image to be mark and material information to be marked; the image to be marked is uploaded by the intelligent terminal via wired network or wireless network, the intelligent terminal may be a mobile phone, a personal computer or a tablet computer, the image to be marked is not limited as logos, photographs, design drawings and three-dimensional pictures. The intelligent marking terminal refers to marking machine for marking. The image processing module 312 at the intelligent processing center is used to generate the image process information according to the image to be marked;

a material information matching module 313 at the intelligent processing center, configure to use the material information to be marked to search corresponding power range information in the matching relation table;

a marking parameter generating module 314 at the intelligent processing center, configured to generating marking parameter according to the image process information and power range information, and output to the intelligent marking terminal;

a marking module 321 at the intelligent marking terminal, configured to use the marking parameter to mark.

In the embodiment, the image process information includes: pixel dot coordinate and pixel dot gray scale value, the image processing module 312 further includes:

a gray scale value transforming sub-module at the intelligent processing center, configured to transform the image to be marked to a gray scale image;

a pixel determining sub-module at the intelligent processing center, configured to determine the coordinate of each pixel dot in the gray scale image and the corresponding pixel dot gray scale value.

Wherein, the marking parameter includes: pixel dot coordinate and pixel dot output power, the marking parameter generating module 314 further includes:

a power matching sub-module at the intelligent processing center, configured to search pixel dot output power corresponding to pixel dot gray scale value from the output power range information;

a parameter combination sub-module at the intelligent processing center, configured to combine the pixel dot coordinate and the pixel dot output power to form the marking parameter.

Wherein, the obtaining module 311 further includes:

a material information obtaining sub-module at the intelligent processing center, configured to obtain the marking material information analyzed by the intelligent marking terminal.

Wherein the method for obtaining the matching relation table includes:

according to the user's requirement, and/or, according to cloud calculating analyzing.

The embodiment about laser marking machine is basically similar as the embodiment about laser marking method, thusly it is described concisely. The related part may be referred to the embodiment about laser marking method.

Figure 16:
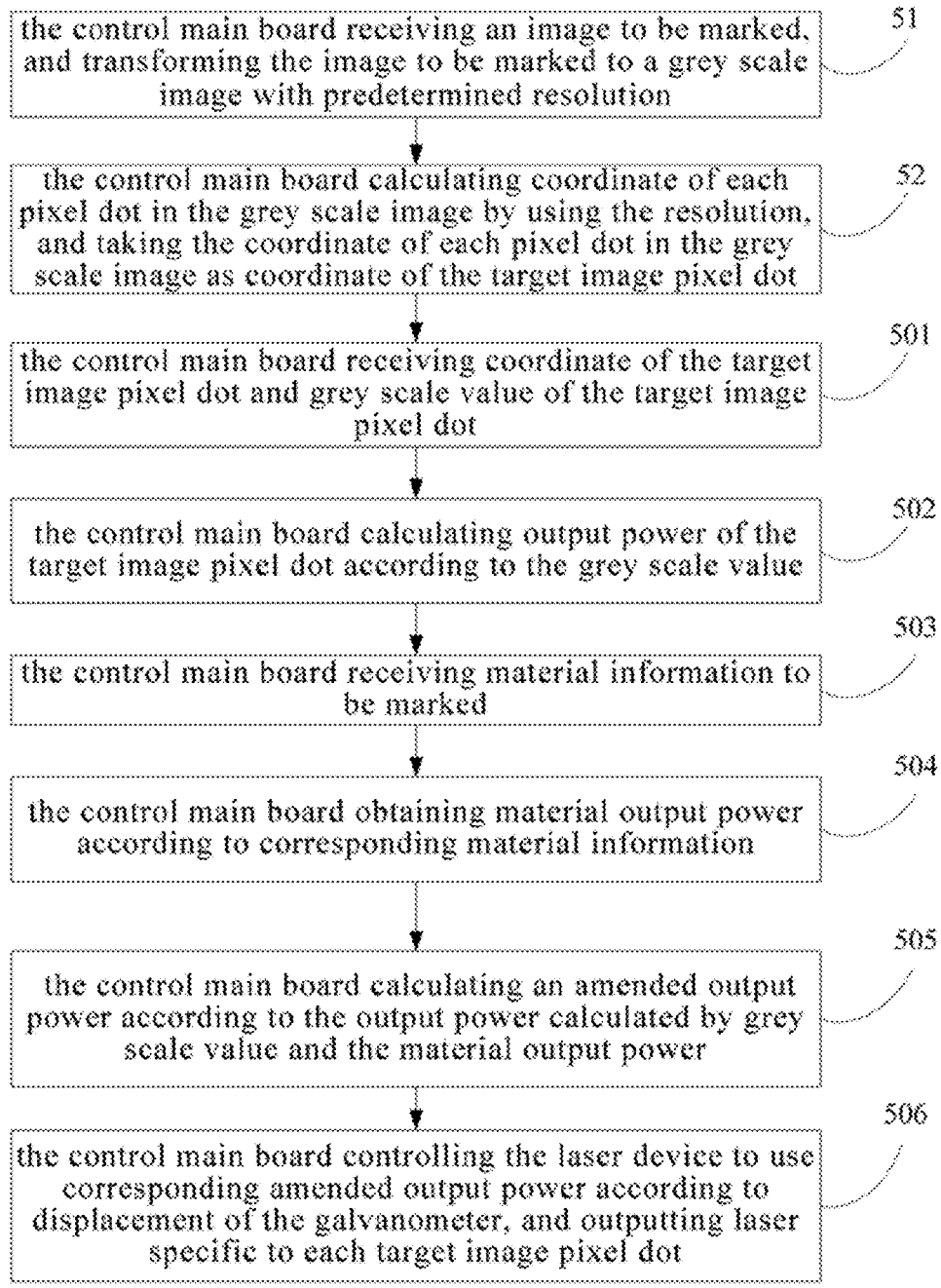
FIG. 16 is a flow chart showing another a marking method according to the embodiment of the disclosure.

A fourth embodiment of the disclosure discloses a laser marking method, as shown in FIG. 16, wherein a laser marking machine is used to mark. The laser marking machine is controlled by a control platform, the control platform may be the control main board integrated in the laser marking machine as in the first embodiment, or the remote server or intelligent processing center as in the second and third embodiments. When the control platform is a control main board in the laser marking machine, the control main board may have the function of storage, calculation, controlling or the like, which controls the laser device and galvanometer in the laser marking machine to mark. When the control platform is a remote server or intelligent processing center, the control platform may be connected to the control main board of the laser marking machine via signal.

The laser marking machine includes: a control main board, a laser device and a galvanometer connected to the control main board via signals, the galvanometer is configured to move at a predetermined moving speed on the basis of coordinate of target image pixel dot; the laser device is configured to output laser, the laser marking method may include steps of:

Step 501: the control main board receiving coordinate of the target image pixel dot and gray scale value of the target image pixel dot;

Step 502: the control main board calculating output power of the target image pixel dot according to the gray scale value;

Step 503: the control main board receiving material information to be marked; in the step, the control main board may obtain material information from the control platform such as intelligent processing center.

Step 504, the control main board obtaining material output power according to corresponding material information; in this step, the material output power may be specific value or numerical range.

Step 505, the control main board calculating an amended output power according to the output power calculated by gray scale value and the material output power;

Step 506, the control main board controlling the laser device to use corresponding amended output power according to displacement of the galvanometer, and outputting laser specific to each target image pixel dot.

Prior to Step 501, the method may further include:

Step 51, the control main board receiving an image to be marked, and transforming the image to be marked to a gray scale image with predetermined resolution; and Step 52, the control main board calculating coordinate of each pixel dot in the gray scale image by using the resolution, and taking the coordinate of each pixel dot in the gray scale image as coordinate of the target image pixel dot.

In step 51, the image to be marked may be transmitted to the control main board via intelligent terminal (such as mobile phone, personal computer or tablet computer) connected to the control main board in a wired or wireless way.

To a further processing to the step 302 in the former third embodiment, such as step 502, 503 and 504, the amended output power of each pixel dot of the target image may be obtained by the matching relation table of material information and corresponding power range provided in the third embodiment. However, the invention is not limited to be performed in the sequence of step 501 to step 505, for example, step 502 may be executed before step 503 and step 504, that is, an output power is first calculated according to gray scale value, then a material output power is obtained according to the material information, afterwards, in step 505, the power range corresponding to the material in the matching relation table is used to amend the output power obtained in step 502 and obtaining a amended output power. At the same time, step 502 can also be performed after step 503 and step 504, for example, obtaining material output power in step 503 and 504 may be performed first, for example if the material to be marked is plastic, it is predetermined that gray scale value 1 corresponds to material output power 0.02 w, gray scale value 255 corresponds to material output power 5 w, then step 502 and step 505 are performed, determining the amended output power of the pixel dot in the range [0, 255] according to the gray scale value of each target pixel dot.

In an embodiment, step 506 may further include sub-steps of:

Sub-step 5061, the control main board judging whether the time when the galvanometer is displaced to current pixel dot reaches a predetermined time delay;

Sub-step 5062: if yes, then determining that the galvanometer is displaced to the current pixel dot;

Sub-step 5063: when determining the galvanometer is displaced to the current pixel dot, the control main board controlling the laser device to output laser with corresponding output power specific to the current pixel dot.

The sub-steps may be referred to the sub-steps S31-S33 in the first embodiment, which is not illustrated herein for concise.

In an embodiment, sub-step 5063 may further include:

Sub-step 50631: the control main board adjusting output current of the pump by using the output power;

Sub-step 50632: the work fibre receiving the output current to store fibre energy; and Sub-step 50633: when the galvanometer moves to the current pixel dot, the control main board sending out a switch instruction, the output switch releasing energy storage of a single laser period in response to the instruction; and the laser period being a period of time the work fibre starts to store energy until releasing energy.

Similarly, the disclosure discloses laser marking equipment corresponding to the laser marking method, the laser marking machine is controlled by a control platform, the laser marking machine includes: a laser device and a galvanometer signally connected to the control platform, the galvanometer being configured to move at a predetermined moving speed on the basis of coordinate of target image pixel dot; and the laser device being configured to output laser. The laser marking equipment may further include the following modules:

a first calculation module at the control platform, configured to calculate output power of the target image pixel dot according to the gray scale value;

a second obtaining module at the control platform, configured to obtain the material information to be marked;

a third obtaining module at the control platform, configured to obtain the corresponding material output power according to the material information;

a secondary calculation module at the control platform, configured to calculate the amended output power of the target image pixel dot according to the output power calculated by the gray scale value and the material output power;

the control module at the control platform, configured to control the laser device to use corresponding amended output power according to displacement of the galvanometer, and output laser specific to each target image pixel dot.

In an embodiment, the control platform is disposed with matching relation table of material information and corresponding power range, the secondary calculation module obtains an amended output power by searching the material information and the gray scale value in the matching relation table to find the corresponding power range information.

In an embodiment, the method for obtaining the matching relation table includes:

according to the user's requirement and/or according to cloud calculation and analyzing.

Figure 15:
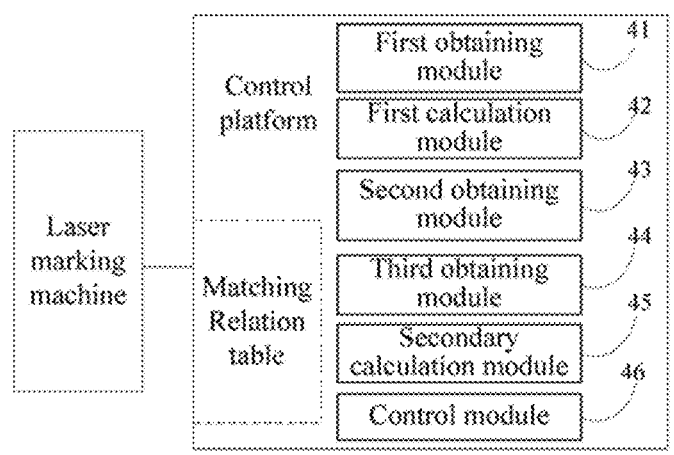
FIG. 15 is a schematic diagram showing the laser marking system according to the embodiment of the disclosure.

The invention further discloses a laser marking system corresponding to the laser marking method in the forth embodiment, as shown in FIG. 15, the laser marking system includes: a control platform, an intelligent terminal and a laser marking machine connected to the control platform in wired way or wireless way. The control platform may be the control main board in the first embodiment, and it may also be the remote server or intelligent processing center in the second and third embodiments, or the combination thereof. The laser marking machine may include the laser device, galvanometer and other elements in the first embodiment, which is controlled by the control platform to perform laser marking. At the same time, as shown in the third embodiment, the laser marking machine may analyse the material information, the intelligent terminal is used to upload image to be marked to the control platform, the laser marking system may further include:

a first obtaining module 41 at the control platform, configure to obtain the coordinate of the target image pixel dot and the gray scale value of the target image pixel dot;

a first calculation module 42 at the control platform, configured to calculate output power of the target image pixel dot according to the gray scale value;

a second obtaining module 43 at the control platform, configured to obtain the material information to be marked;

a third obtaining module 44 at the control platform, configured to obtain the corresponding material output power according to the material information;

a secondary calculation module 45 at the control platform, configured to calculate the amended output power of the target image pixel dot according to the output power calculated by the gray scale value and the material output power;

the control module 46 at the control platform, configured to control the laser device to use corresponding amended output power according to displacement of the galvanometer, and output laser specific to each target image pixel dot.

In the embodiment above, the material information to be marked may be obtained by analysis of the laser marking machine and provided to the second obtaining module, that is, the laser marking machine may include a material analysing module.

When the control platform includes a control main board and an intelligent processing center at the same time, the first obtaining module, the first calculation module, the second obtaining module, the third obtaining module, the control module may be disposed at the control main board, and the intelligent processing center may include a storage module for storing matching relation table between material information and material output power, and it may also have the above-mentioned secondary calculation module, the intelligent terminal may include a material analysing module.

In an embodiment, also referring to FIG. 9, the above-mentioned control module further includes:

a judging sub-module at the control platform 9132, configured to judge whether the time when the galvanometer is displaced to current pixel dot reaches a predetermined time delay;

a determining sub-module at the control platform 9131, configured to determine that the galvanometer is displaced to the current pixel dot, in the case that it is judged the time when the galvanometer is displaced to current pixel dot reaches the predetermined time delay; and an output sub-module at the control platform 9133, configured to control the laser device to output laser with corresponding output power specific to the current pixel dot, when it is determined that the galvanometer is displaced to the current pixel dot.

In an embodiment, the predetermined time delay includes: acceleration delay, uniform-speed delay and deceleration delay; and the judging sub-module further comprises:

an acceleration delay judging sub-module 9132$a$, configured to judge whether the time when the galvanometer is displaced to current pixel dot reaches the predetermined acceleration delay, when the current pixel dot is a start pixel dot;

and/or a uniform-speed delay judging sub-module 9132b, configured to judge whether the time when the galvanometer is displaced to current pixel dot reaches the predetermined uniform-speed delay, when the current pixel dot is a midway pixel dot;

and/or a deceleration delay judging sub-module 9132c, configured to judge whether the time when the galvanometer is displaced to current pixel dot reaches the predetermined deceleration delay, when the current pixel dot is an end pixel dot.

In an embodiment, the laser marking system further includes:

a second receiving module 914 at the control platform, configured to receive an image to be marked and to transform the image to be marked to a gray scale image with predetermined resolution, prior to the step of the control platform receiving the coordinate of the target image pixel dot and the gray scale value of the target image pixel dot; and a second calculation module 915 at the control platform, configured to calculate coordinate of each pixel dot in the gray scale image by using the resolution, and to regard the coordinate of each pixel dot in the gray scale image as coordinate of the target image pixel dot.

In an embodiment, the laser device includes: a pump, a work fibre connected to the pump and an output switch connected to the work fibre; the output sub-module further comprises:

a current adjustment sub-module 9133a at the control platform, configured to adjust output current of the pump by using the output power;

a receiving sub-module at the work fibre 9133b, configured to receive the output current to store fibre energy; and a switch sub-module 9133c at the control platform, configured to send out a switch instruction such that the output switch releases energy storage of a single laser period in response to the instruction, when the galvanometer is moved to the current pixel dot, the laser period being a period of time the work fibre starts to store energy until releasing energy.

In an embodiment, the laser marking system further includes:

a speed adjustment module 916 at the control platform, configured to adjust the moving speed of the galvanometer by using the output power.

In an embodiment, the power amendment module may use the matching relation table of the material information and corresponding power range in the third embodiment to obtain the amended output power of each pixel dot in the target image.

The various embodiments in the specification have been explained step by step. Each of the embodiments has only emphasized the differences from others, and the same or similar parts between embodiments could be referred to each other.

It should be understood by those skilled in the art, embodiments of in the disclosure could be provided as method, device and computer program product. Therefore, the embodiments of in the disclosure may employ the forms of complete hardware embodiment, complete software embodiment or combination of hardware and software. Further, the embodiments of in the disclosure may employ the form of computer program product realizable on one or more of computer available recording medium (including but not limited to magnetic disk storage medium, compact disk-read only memory (CD-ROM) and optical storage medium, for example) containing computer available program codes.

The embodiments of in the disclosure has been described with reference to flow chart and/or block diagram of method, terminal device (system) and computer program product according thereto. It should be understood that each of and combination of steps and/or modules in flow chats and/or block diagrams could be realized by computer program instructions. The computer program instructions may be provided for a universal computer, as dedicated computer, an embedded processor or a processor of other programmable data processing terminal device to generate a machine, such that the instructions executed by the computer or the processor of other programmable data processing terminal device may form devices for realizing functions specified by one or more steps in the flow charts and/or one or more modules in the block diagrams.

The computer program instructions may also be stored in computer readable memory capable of booting the computer or other programmable data processing terminal device to run in a designated mode, such that the instructions stored in the computer readable memory may form a manufactured product containing instruction device. The instruction device may realize functions specified by one of more steps in the flow charts and/or one or more modules in the block diagrams.

The computer program instructions may also be loaded into the computer or other programmable data processing terminal device, such that the computer or other programmable terminal device may execute a series of operation steps to generate processing realizable by the computer, and in turn the instructions executed on the computer or other programmable terminal device may provide steps for realizing functions specified by one or more steps in the flow charts and/or one or more modules in the block diagrams.

Although preferred embodiments of the disclosure have been described, those skilled in the art may make additional amendments and modifications to the embodiments with substantial creative concept thereof. Therefore, the appended claims are intended to be constructed as encompassing the preferred embodiments and all the amendments and modifications falling into the scope of the embodiments of the disclosure.

In the end, it will be explained that, the terms "first", "second", etc. are only used herein to distinguish one element or operation from another element or operation, and does not necessarily require or suggest that there are any actual relationship or sequence between these elements or operations. Further, the terms "comprise", "include" and any other variants thereof are intended to cover a non-exclusive "comprise", so that process, method, product or terminal device which includes a series of elements may include not only those elements but also other elements that do not be definitely listed herein, or also may include inherent elements of the process, method, product or equipment. In the absence of more restrictions, an element defined by the statement "includes a . . . " is not meant to exclude other same elements in the process, method, product or equipment including this element.

The laser marking method, laser marking machine and system having the same provided in the disclosure have been described in detail. Herein the principles and embodiments of the disclosure are illustrated by way of specific examples. The embodiments described above are only intended to help understand the method and main concept of the disclosure. Meanwhile, for an ordinary person skilled in the art, variations could be made to the specific embodiments and their application scope in accordance with the concept of the disclosure. In summary, the disclosure of the specification should not be construed as limiting of the disclosure.

The invention claimed is:

1. A laser marking machine, wherein the laser marking machine comprises: a control main hoard, a laser device and a galvanometer, the laser device and the galvanometer being connected to the control main board, respectively; the galvanometer being configured to move at a predetermined moving speed on the basis of coordinate of target image pixel dot; the laser device being configured to output laser; the laser marking machine further comprises:
   a first receiving module at the control main board, configured to receive coordinate of the target image pixel dot and gray scale value of the target image pixel dot;
   a first calculation module at the control main board, configured to calculate output power of the target image pixel dot by using the gray scale value; and
   a control module at the control main board, configured to control the laser device to use corresponding output power according to displacement of the galvanometer, and to output laser specific to each target image pixel dot;
   wherein the control module further comprises:
   a judging sub-module at the control main board, configured to judge whether the time when the galvanometer is displaced to current pixel dot reaches a predetermined time delay;
   a determining sub-module at the control main board, configured to determine that the galvanometer is displaced to the current pixel dot, in the case that it is judged the time when the galvanometer is displaced to current pixel dot reaches the predetermined time delay; and
   an output sub-module at the control main board, configured to control the laser device to output laser with corresponding output power specific to the current pixel dot, when it is determined that the galvanometer is displaced to the current pixel dot.

2. The laser marking machine according to claim 1, wherein
   the predetermined time delay includes: acceleration delay, uniform-speed delay and deceleration delay; and the judging sub-module further comprises at least one of the following:
   an acceleration delay judging sub-module, configured to judge whether the time when the galvanometer is displaced to current pixel dot reaches the predetermined acceleration delay, when the current pixel dot is a start pixel dot;
   a uniform-speed delay judging sub-module, configured to judge whether the time when the galvanometer is displaced to current pixel dot reaches the predetermined uniform-speed delay, when the current pixel dot is a midway pixel dot;
   a deceleration delay judging sub-module, configured to judge whether the time when the galvanometer is displaced to current pixel dot reaches the predetermined deceleration delay, when the current pixel dot is an end pixel dot.

3. The laser marking machine according to claim 1, wherein the laser marking machine further comprises:
   a second receiving module at the control main board, configured to receive an image to be marked and to transform the image to be marked to a gray scale image with predetermined resolution, prior to the step of the control main board receiving the coordinate of the target image pixel dot and the gray scale value of the target image pixel dot; and
   a second calculation module at the control main hoard, configured to calculate coordinate of each pixel dot in the gray scale image by using the resolution, and to regard the coordinate of each pixel dot in the gray scale image as coordinate of the target image pixel dot.

4. The laser marking machine according to claim 3, wherein the laser device comprises: a pump, a work fibre connected to the pump and an output switch connected to the work fibre; the output sub-module further comprises:
   a current adjustment sub-module at the control main board, configured to adjust output current of the pump by using the output power;
   a receiving sub-module at the work fibre, configured to receive the output current to store fibre energy; and
   a switch sub-module at the control main board, configured to send out a switch instruction such that the output switch releases energy storage of a single laser period in response to the instruction, when the galvanometer is moved to the current pixel dot, the laser period being a period of time the work fibre starts to store energy until releasing energy.

5. The laser marking machine according to claim 4, wherein the laser marking machine further comprises:
   a speed adjustment module at the control main board, configured to adjust the moving speed of the galvanometer by using the output power.

* * * * *